United States Patent
Kercso et al.

(10) Patent No.: US 8,872,432 B2
(45) Date of Patent: Oct. 28, 2014

(54) SOLUTION FOR DYNAMIC LIGHTING CONTROL

(75) Inventors: Bertalan Kercso, Budapest (HU); Laszlo Balazs, Godollo (HU); Istvan Maros, Budapest (HU)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 13/421,357

(22) Filed: Mar. 15, 2012

(65) Prior Publication Data

US 2013/0241418 A1     Sep. 19, 2013

(51) Int. Cl.
H05B 37/02     (2006.01)

(52) U.S. Cl.
USPC ............ 315/152; 315/154; 315/155; 315/307

(58) Field of Classification Search
USPC .................... 315/151–155, 294, 312, 362
See application file for complete search history.

(56) References Cited

U.S. PATENT DOCUMENTS

| | | |
|---|---|---|
| 5,662,411 A | 9/1997 | Haslam et al. |
| 6,118,231 A | 9/2000 | Geiginger et al. |
| 6,794,830 B2 | 9/2004 | Lansing et al. |
| 6,867,558 B2 | 3/2005 | Gaus, Jr. et al. |
| 8,038,481 B1 | 10/2011 | Creighton et al. |
| 2005/0242267 A1 | 11/2005 | Lovato et al. |
| 2007/0216313 A1 | 9/2007 | Soccoli et al. |
| 2009/0229190 A1 | 9/2009 | Daniel-Wayman et al. |
| 2009/0254004 A1 | 10/2009 | Graichen et al. |
| 2010/0060173 A1 | 3/2010 | Scharf |
| 2010/0201267 A1 | 8/2010 | Bourquin et al. |
| 2011/0140611 A1 | 6/2011 | Elek et al. |
| 2011/0184577 A1 | 7/2011 | Ilyes |
| 2011/0199004 A1* | 8/2011 | Henig et al. .................. 315/152 |
| 2012/0038281 A1* | 2/2012 | Verfuerth ...................... 315/152 |
| 2012/0043910 A1 | 2/2012 | Nagashima et al. |
| 2012/0229032 A1* | 9/2012 | Van De Ven et al. ......... 315/151 |
| 2013/0241420 A1* | 9/2013 | Bal zs et al. .................. 315/154 |

FOREIGN PATENT DOCUMENTS

| | | |
|---|---|---|
| JP | 2009054496 A | 3/2009 |
| WO | 2008135942 A1 | 11/2008 |
| WO | 2010010493 A2 | 1/2010 |
| WO | 2010100586 A2 | 9/2010 |

(Continued)

OTHER PUBLICATIONS

Search Report and Written Opinion from corresponding PCT Application No. PCT/US2013/026641 dated Jul. 1, 2013.

(Continued)

*Primary Examiner* — Vibol Tan
(74) *Attorney, Agent, or Firm* — Global Patent Operation; Peter T. DiMauro

(57) ABSTRACT

A lighting system and method for controlling illumination of the same upon detection of a user in at least one of a first detection area and a second detection area. The lighting system can include a lighting fixture having one or more lighting sources and at least two sensors associated with separate detection areas. Each sensor can send a signal to a controller associated with the lighting fixture, and the controller can be configured to vary the illumination of one or more of the lighting sources depending on the each sensor's detection area. The present subject matter facilitates energy savings since areas away from an occupied area are not illuminated. Communication between neighboring lighting fixtures is not required since each lighting fixture can detect the presence of a user in an area proximate an adjacent lighting fixture in order to trigger illumination of the lighting fixture.

13 Claims, 4 Drawing Sheets

(56) References Cited

FOREIGN PATENT DOCUMENTS

| WO | 2011055259 | A1 | 5/2011 |
| WO | 2011098931 | A1 | 8/2011 |
| WO | 2011134003 | A1 | 11/2011 |

OTHER PUBLICATIONS

International Search Report and Written Opinion from PCT Application No. PCT/US2013/030758 on Jul. 22, 2013.

* cited by examiner

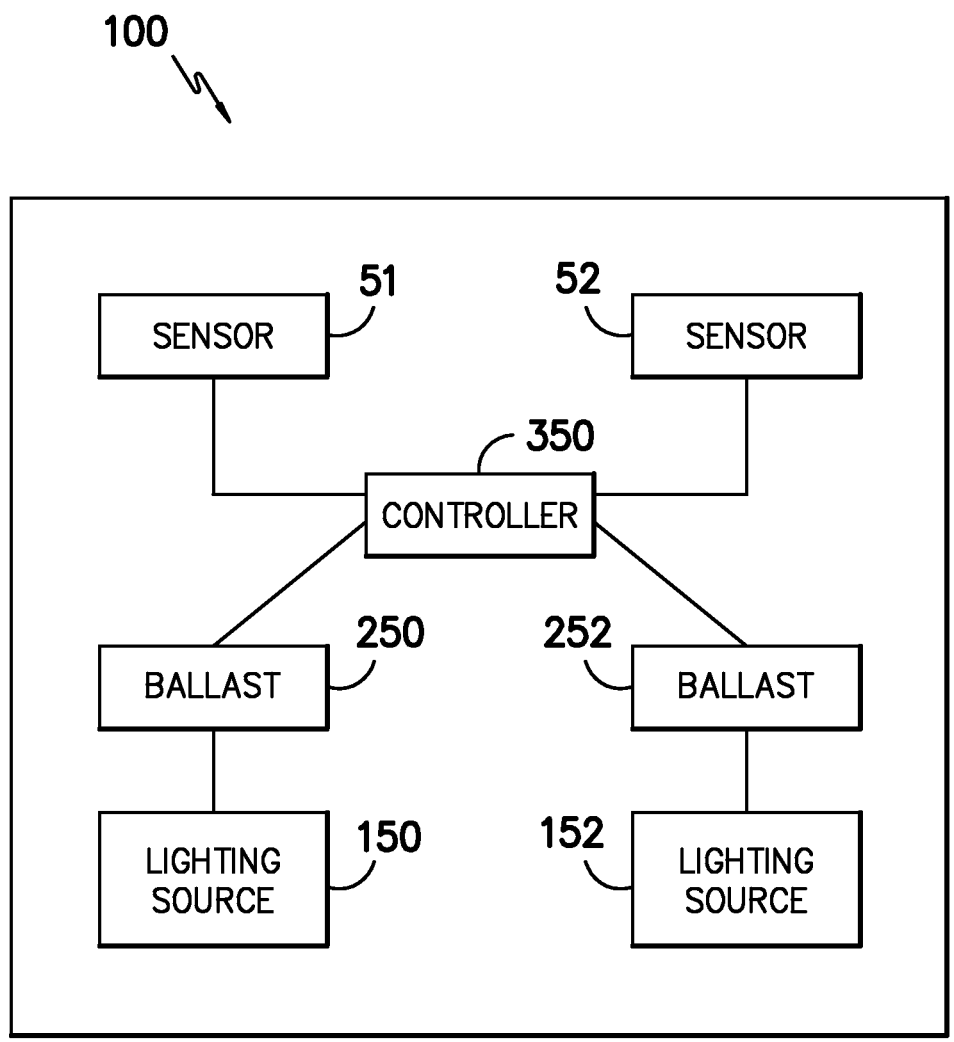
FIG. -1-

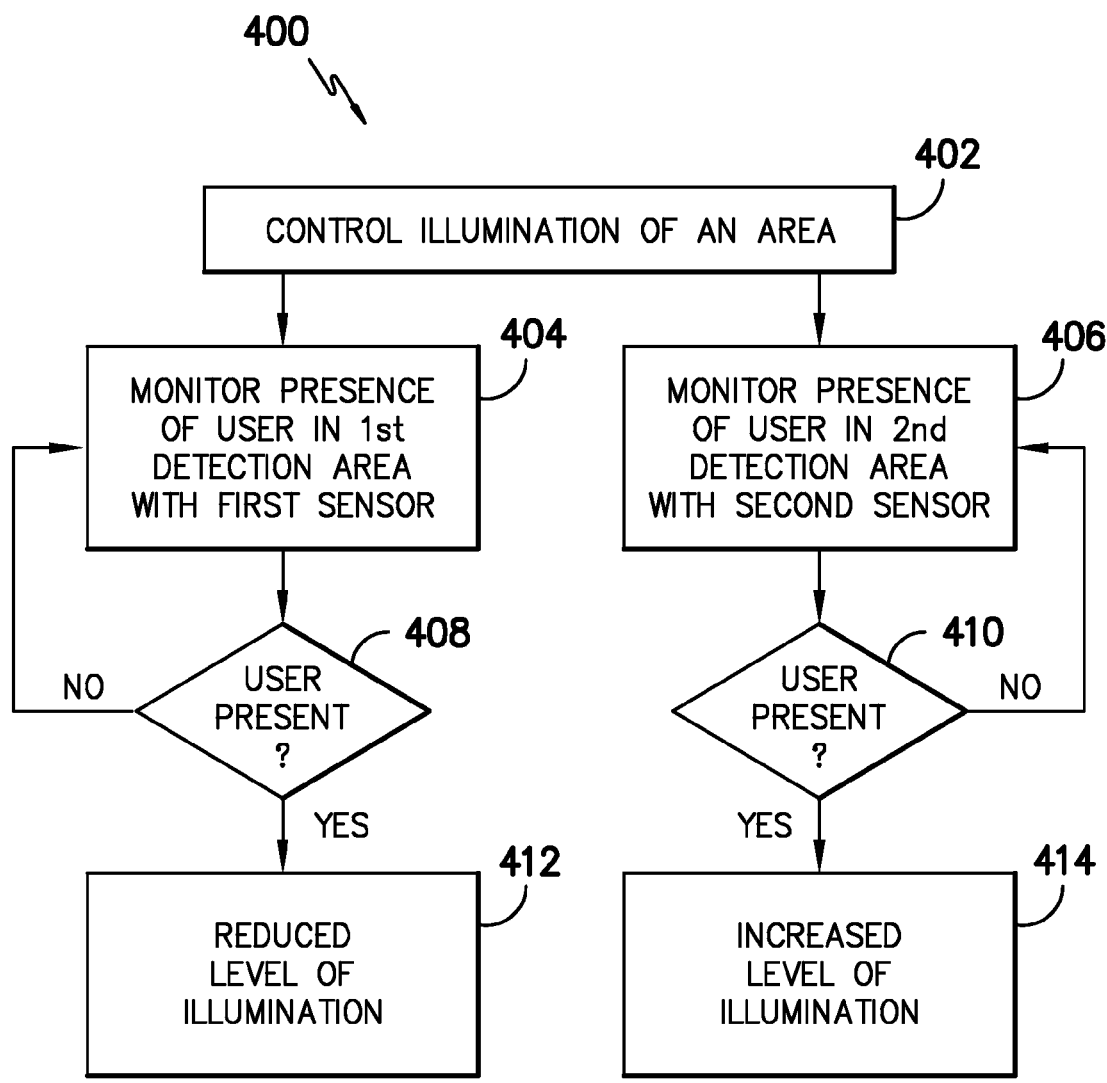
FIG. -2-

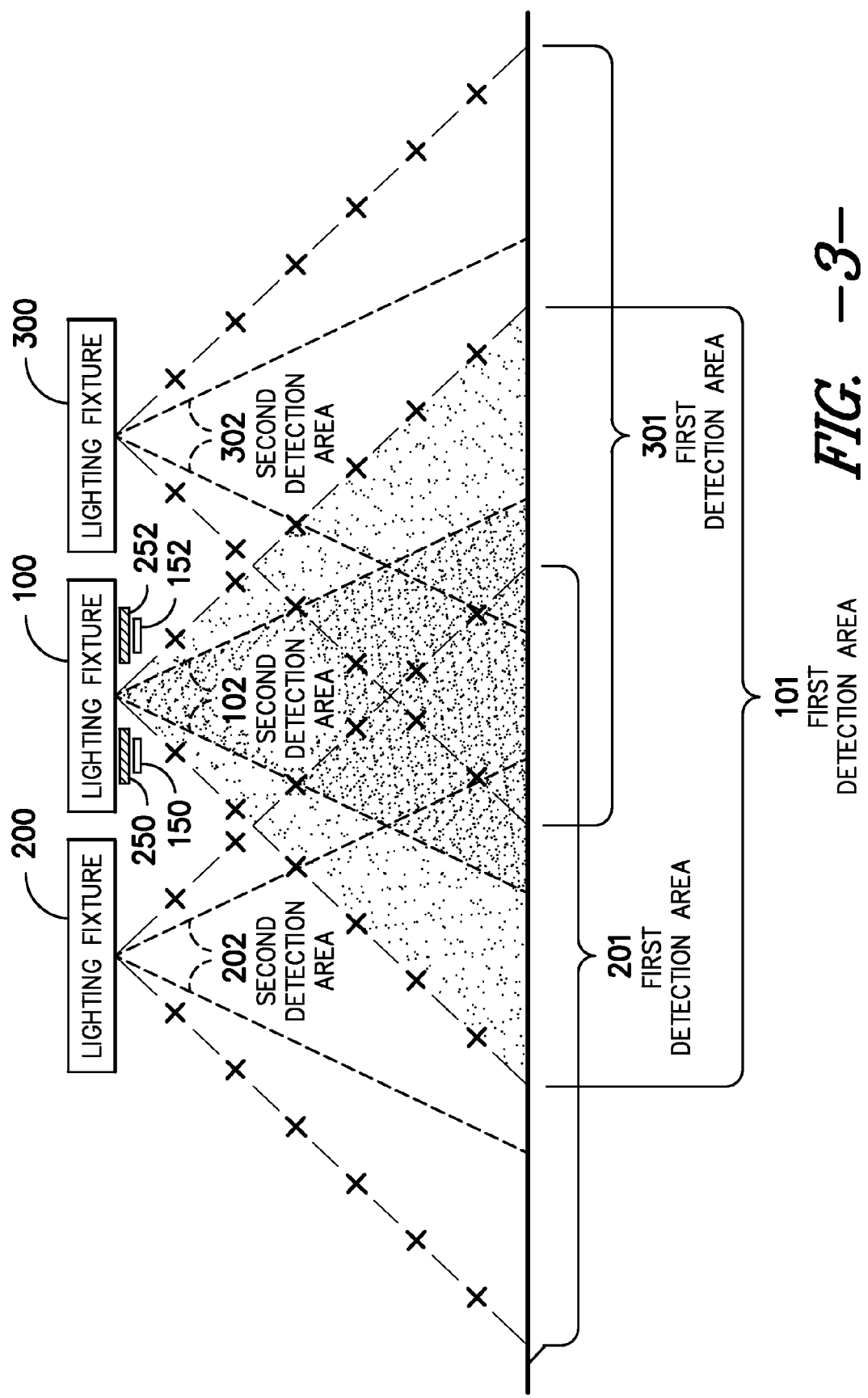
FIG. -3-

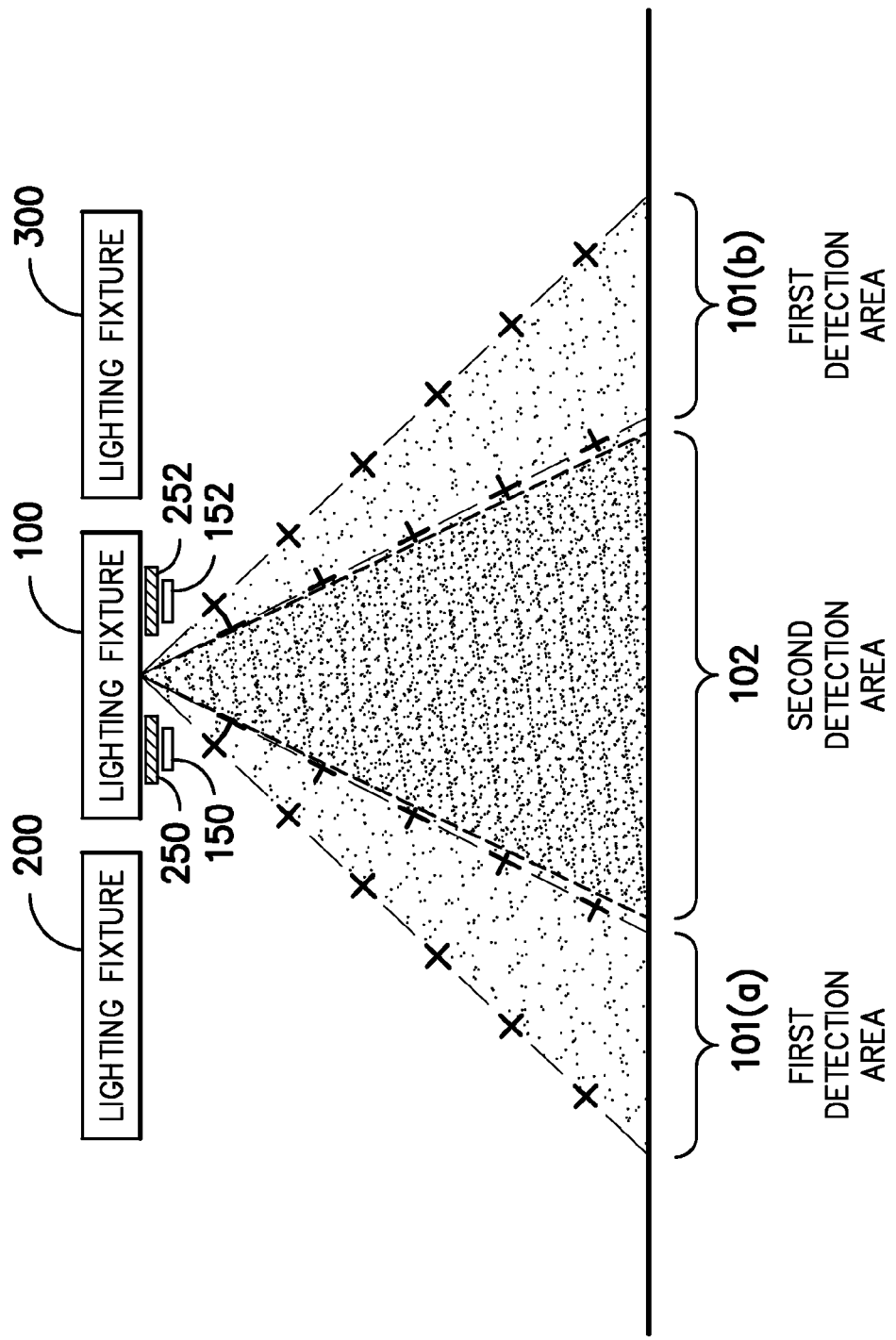
FIG. -4-

SOLUTION FOR DYNAMIC LIGHTING CONTROL

BACKGROUND OF THE INVENTION

A. Field of the Invention

The field of the invention relates to lighting generally, and more particularly, to a lighting system and method for illuminating one or more light sources upon detection of a user in at least one of a first detection area and a second detection area.

B. Description of Related Art

In large buildings or outdoor spaces, it is often desirable to provide a control system for the lighting in the building or outdoor space in order to reduce energy costs. Currently, lighting in an area can be controlled by various means such as from a central location, by remote control, or by motion detection. Centrally located lighting control systems require the integration of sensors and lighting drivers into a dedicated analogue/digital/communications system such as can be implemented by the digital addressable lighting interface (DALI) protocol. This often requires rewiring of a facility, which can be time-consuming, disruptive to operations, and expensive. Additionally, once the lighting control system is installed, commissioning and maintenance are required, and this can be expensive and involves special expertise. Moreover, the lighting control may not be automatic and requires input in order to control the luminosity in a room. Further, although wireless communication systems can be installed, the lighting control is still not automatic.

Additionally, lighting in an area can be controlled by a remote control, but this requires user input as well, and is also not automatic. Thus, energy savings are not likely to be great. Motion sensors can also be used to control lighting in an area to save energy, but such a system can be characterized by abrupt on and off cycles that do not provide continuous light to an area where a user is present, such as when the user is at the border of the detection area of one of the motion sensors. Therefore, while the use of a centrally located lighting control system, a remote lighting control system, or motion detector system can provide for some energy savings, a lighting control system that is more energy efficient, that does not require total rewiring of an area, that does not require expensive maintenance, and that does not have abrupt on and off cycles would be beneficial. Additionally, the ability to control the lighting in an area without the need to communicate between multiple lighting fixtures would also be beneficial and cost effective.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a lighting fixture. The lighting fixture can include a controller, a first sensor configured to send a signal to the controller upon the detection of the presence of a user in a first detection area, and a second sensor configured to send a signal to the controller upon the detection of the presence of a user in a second detection area. The controller can be configured to control the one or more lighting sources to provide varying levels of illumination based at least in part on the signals received from the first sensor and the second sensor. Before operation, one or more lighting sources can be coupled with the controller.

Another aspect of the present disclosure is directed to a method for controlling illumination of an area. The method can include monitoring the presence of a user in a first detection area with a first sensor associated with a lighting fixture, monitoring the presence of a user in a second detection area with a second sensor associated with the lighting fixture, and controlling illumination provided by the lighting fixture via a controller upon detection of a user in the first detection area or the second detection area.

Another exemplary embodiment of the present disclosure is directed to a lighting system. The lighting system can include a first lighting fixture and a second lighting fixture. The first lighting fixture can include a controller, a first sensor configured to monitor the presence of a user in a first detection area, and a second sensor configured to monitor the presence of a user in a second detection area. The first detection area can extend to an area proximate the second lighting fixture. The second detection area can be proximate an area beneath the first lighting fixture. The controller can be configured to control the one or more lighting sources associated with the first lighting fixture to provide varying levels of illumination upon the detection of a user in the first detection area or the second detection area. Prior to operation, one or more lighting sources can be coupled with the controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Reference is now made briefly to the accompanying drawings, in which:

FIG. 1 is a block diagram of a lighting fixture that can be a component of a lighting control system according to an exemplary embodiment of the present disclosure;

FIG. 2 is a flow chart of a method for controlling illumination of an area according to an exemplary embodiment of the present disclosure;

FIG. 3 is a side view of a lighting system showing multiple lighting fixtures having two detection areas according to an exemplary embodiment of the present disclosure;

FIG. 4 is a side view of a lighting system showing multiple lighting fixtures having two detection areas according to another exemplary embodiment of the present disclosure.

Repeat use of reference characters throughout the present specification and appended drawings is intended to represent the same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a lighting fixture, a lighting system, and a method for controlling the illumination of an area. The lighting system can include a lighting fixture that can have at least two sensors associated with at least two detection areas. The sensors can be configured to detect the presence of a user in their respective detection areas. Each sensor can send a signal to a controller associated with the lighting fixture, and the controller can be configured to then vary the level of illumination of the one or more lighting sources associated with the lighting fixture. While two sensors are described, it is to be understood that the use of a single sensor with spatial resolution is contemplated, whereby the single sensor can detect the presence of a user in more than one detection area. The single sensor can then be configured to send multiple signals to a controller to indicate which detections areas are occupied.

Regardless of how many sensors are utilized, depending on where a user is detected, the controller can illuminate a first lighting source, a second lighting source, or both lighting sources so that different lighting sources can be illuminated depending on the sensor's detection area, resulting in either decreased or increased levels of illumination. By way of another example, the controller can illuminate one or more lighting sources at either a reduced level or an increased level depending on the sensor's detection area. Further, it is to be understood that each lighting source can include an individual light bulb or groups of light bulbs based on the desired light output.

The present subject matter allows for energy savings as remote areas away from an occupied area are not illuminated. Communication between neighboring lighting fixtures is not required as each lighting fixture can detect the presence of a user in an area proximate an adjacent lighting fixture in order to trigger the illumination of the lighting fixture. Thus, the design does not require wired or wireless communication between multiple lighting fixtures. In addition, the design is simple, cost effective, and expandable without limit.

FIG. 1 is a block diagram of one embodiment of a lighting fixture 100 that can be a component of a lighting system for dynamic lighting control where the lighting fixture includes two lighting sources, although it is to be understood that the present disclosure also contemplates the use of a lighting fixture with only one lighting source or more than two lighting sources. The lighting fixture 100 can have a first sensor 51, a second sensor 52, a first lighting source 150, a second lighting source 152, a first ballast 250, a second ballast 252, and a controller 350. The lighting sources 150 and 152, for example, as well as any other lighting sources, can be instant on and can include fluorescent tubes, white light emitting diodes (LEDs), LED arrays that combine white and red LEDs, a combination of fluorescent tubes and LEDs, or any other suitable lighting sources. These lighting sources 150 and 152 can be manufactured, shipped and/or sold separately from the lighting fixture 100. The one or more lighting sources 150 and 152 can be removably coupled with the controller 350, for example via wiring, circuitry and/or light socket(s) that receive an end (or ends) of the lighting sources 150, 152.

The lighting fixture 100 in FIG. 1 shows a first ballast 250 associated with the first lighting source 150 and a second ballast 252 associated with the second lighting source 152. In general, ballasts stabilize the current through an electrical load to provide the proper power to a component. The ballasts 250 and 252 can thus be used to regulate the power provided to each lighting source 150 and 152 within the lighting fixture.

As shown in FIG. 1, the lighting fixture 100 can also include a first sensor 51 associated with a first detection area and a second sensor 52 associated with a second detection area. The first sensor 51 can be used to determine if a user is in a first detection area, while the second sensor can be used to determine if a user is in a second detection area. Based on the detection area in which a user is detected, the controller 350 can vary the levels of illumination from the lighting sources in the lighting fixture 100, such as lighting sources 150 and 152, as will be discussed in more detail below.

The sensors 51 and 52 can be motion sensors or occupancy sensors. Motion sensors respond to walking or other movements. They perceive movements in the selected detection zone and respond to them. Lighting source 150, lighting source 152, or both lighting sources can be switched on once a movement is detected by the motion sensor. The lighting source 150, lighting source 152, or both lighting sources can then switch off after no movement is detected for a period of time. The use of motion sensors is recommended for detecting moving objects outdoors or in corridors indoors, where there is more likely to be constant movement that can be detected.

On the other hand, sensors 51 and 52 can be occupancy sensors. Occupancy sensors detect the presence of a user in an area instead of detecting movements. Thus, occupancy sensors can be more effective in areas such as offices where the user is more sedentary, as opposed to areas such as corridors where more movement is occurring. Numerous types of occupancy sensors exist, including passive infrared (PIR) occupancy sensors, active ultrasonic occupancy sensors, dual-technology passive infrared and active ultrasonic occupancy sensors, dual-technology passive infrared and microphonic occupancy sensors, and any other suitable sensors.

PIR sensors function by monitoring the patterns of background heat energy in the space where the sensor is installed. When the sensor 51 or 52 detects a significant change in the background heat energy, it responds by automatically turning on the lighting source 150 or 152 to which it is coupled by sending a signal to the controller 350. Then, when the background heat energy returns to a stable condition, the sensor does not detect a significant change in the background heat energy, and the controller 350 is then configured to turns off lighting source 150 or 152.

Active ultrasonic occupancy sensors, meanwhile, use sound waves to determine when a lighting source 150 or 152 should be turned on or illuminated. These sensors broadcast sound waves at a frequency higher than the human ear can detect, and the sound waves bounce off walls, objects, and people. When the frequency of the sounds waves changes when the waves return to the sensor, this is known as the Doppler Effect, and indicates that the presence of a user in the area has been detected. The sensor then switches into occupied mode, activates the lighting source, and then returns to unoccupied mode only after the sound wave frequencies stabilize.

Another option is that dual-technology sensors that use both PIR and active ultrasonic technology can be used in large areas, in spaces that are difficult to cover, and in spaces where maximum reliability is important. Dual technology PIR and microphonic occupancy sensors can also be used. The PIR part of the sensor detects initial movement and monitors infrared activity continuously. At the same time, a microphone monitors sound waves and keeps the lighting source 150 or 152 illuminated until the sound activity stabilizes. In the embodiment of FIG. 1, it should be understood that any sensor can be used to detect the presence of a user in an area in order to active a lighting source 150 or 152 and the examples described above should not be limiting.

As shown in FIG. 1, the lighting fixture 100 can also contain a controller 350. The controller can be any device suitable for controlling the illumination of the lighting fixture 100. For instance, the controller can include a microcontroller, microprocessor, or other suitable control circuit. The controller 350 can be configured to vary the illumination of the lighting sources within a lighting fixture, such as the first lighting source 150 and the second lighting source 152 shown in FIG. 1 based at least in part on signals received from the first sensor 51 and the second sensor 52. For example, lighting source 150, lighting source 152, or both can be illuminated by the controller 350 based on the detection of a user in a specific detection area, or they can both be illuminated at reduced levels or increased levels based on the detection of a user in a specific detection area.

As will be described in more detail in FIGS. 3 and 4 below, in one embodiment, a first detection area can extend to an area proximate an adjacent lighting fixture, which covers a wider detection area. If a user is detected in the first detection area by sensor 51, the controller 350 can then either illuminate both lighting source 150 and lighting source 152 at less than full power, or it can randomly illuminate either lighting source 150 or lighting source 152. Meanwhile, the second detection area can be proximate the area beneath the lighting fixture 100, which covers a narrower detection area. If a user is detected in the second detection area by sensor 52, the controller 350 can then illuminate both lighting sources 150 and 152 at full power. It is to be understood that the first detection area and the second detection area can at least partially overlap in one embodiment, while the two detection areas can be disjunctive in another embodiment such that there is no overlap between the two detection areas.

Regardless of the number of lighting sources used, it is also to be understood that when a user is detected in the first detection area, the controller can be configured to control the one or more lighting sources to provide a reduced level of illumination, whether it be from illuminating a random lighting source or illuminating all of the lighting sources at less than full power. Further, regardless of the number of lighting sources used, it is also to be understood that when a user is detected in the second detection area, the controller can be configured to control the one or more lighting sources to provide an increased level of illumination by illuminating the lighting sources at full power.

While the present subject matter is discussed with reference to two detection areas, two sensors, and two lighting sources within a lighting fixture, those of ordinary skill in the art, using the disclosures provided herein, should understand that more than two detection areas, two sensors, and two lighting sources can be used in conjunction with a lighting fixture without deviating from the scope of the present disclosure.

Next, FIG. 2 shows a flow chart that is representative of a method 400 for dynamically controlling lighting in an area through use of one or more lighting sources, two sensors, and two detection areas. The method controls the illumination of an area (402) by monitoring for the presence of user in a first detection area with a first sensor associated with the lighting fixture (404) and by monitoring for the presence of a user in a second detection area with a second sensor associated with the lighting fixture (406). If a user is not detected as present in the first detection area by the first sensor (408), the system continues monitoring for the presence of a user in the first detection area (404) until a user is detected. If a user is detected as present in the first detection area by the first sensor (408), the controller illuminates one or more lighting sources so that the lighting sources are illuminated at a reduced level (412). For example, in one embodiment, both a first lighting source and a second lighting source can be illuminated at less than full power by the controller. As another example, either the first lighting source or second lighting source can be randomly illuminated by the controller.

While the first detection area is being monitored for the presence of a user with a first sensor (404), the method as shown monitors the second detection area for the presence of a user as well (406). If a user is not detected as present in the second detection area with a second sensor (410), the system continues monitoring for the presence of a user in the second detection area (406) until a user is detected. If a user is detected as present in the second detection area (410), the controller illuminates one or more lighting sources so that the lighting sources are illuminated at an increased level (414). For example, in one embodiment, both a first lighting source and a second lighting source can be illuminated at full power by the controller.

FIG. 3 is a side view of a lighting system that includes a first lighting fixture 100, a second lighting fixture 200, and a third lighting fixture 300. Although FIG. 3 shows three lighting fixtures, as will be apparent to one of ordinary skill in the art, the lighting system can contain any number of lighting fixtures with multiple sensors, multiple detection areas, and multiple lighting sources, where at least one controller within each lighting fixture is configured to control the illumination of the lighting sources at decreased or increased levels depending on the presence of a user in various detection areas. In the particular embodiment of FIG. 3, the wider first detection areas, 101, 201, and 301, for each of the three lighting fixtures 100, 200, and 300 are represented by dashed lines with cross-hatches. The narrower second detection areas 102, 202, and 302 for each of the three lighting fixtures 100, 200, and 300 are represented by dashed lines. As can be seen from FIG. 3, each first detection area extends into areas proximate adjacent lighting fixtures, while each second detection area is proximate the area beneath the lighting fixture. As also can be seen from FIG. 3, the wider first detection areas at least partially overlap with the narrower second detection areas.

For example, the middle lighting fixture is lighting fixture 100. Lighting fixture 100 has a first sensor 51 (shown in FIG. 1), a second sensor 52 (shown in FIG. 1), a first lighting source 150, a second lighting source 152, a first ballast 250, a second ballast 252, a first detection area 101, a second detection area 102, and a controller 350 (shown in FIG. 1). The wider first detection area 101, which is associated with sensor 51, extends into the areas proximate adjacent lighting fixtures 200 and 300, as shown by the wider view angle of the lines with cross-hatches. Meanwhile, the narrower second detection area 102, which is associated with sensor 52, is the area proximate the area beneath lighting fixture 100, as shown by the narrower view angle of the dashed lines versus the dashed lines with cross-hatches. Thus, sensor 51 can detect the presence of a user in areas under adjacent lighting fixtures 200 and 300, while sensor 52 can detect the presence of a user under lighting fixture 100 only.

Referring to FIG. 3, when a user is standing under lighting fixture 100, for example, sensor 52 (shown in FIG. 1), which is associated with the second detection area 102, will detect the user and send a signal to the controller 350 associated with lighting fixture 100. The controller 350 (shown in FIG. 1) associated with lighting fixture 100 is then configured to control the one or more lighting sources, such as lighting sources 150 and 152, to provide an increased level of illumination. In this instance, lighting sources 150 and 152 can be illuminated at full power in such a detection scenario. Further, both lighting sources 150 and 152 can be illuminated when a user is detected in detection area 102.

Meanwhile, if the user moves from standing under lighting fixture 100 to standing under either lighting fixture 200 to the left or lighting fixture 300 to the right, or if another user is detected under either lighting fixture 200 or lighting fixture 300, sensor 51 (shown in FIG. 1), which is associated with the first detection area 101 that can overlap with detection area 102 and also corresponds to an area proximate adjacent lighting fixture 200 and lighting fixture 300, will detect the user and send a signal to the controller 350 associated with lighting fixture 100. The controller 350 (shown in FIG. 1) associated with lighting fixture 100 is then configured to control the one or more lighting sources, such as lighting sources 150 and 152, to provide a decreased level of illumination. In this instance, both lighting sources 150 and 152 can be illuminated at less than full power in such a detection scenario. As an alternative, either lighting source 150 or lighting source 152 can be illuminated. Further, the illumination of lighting source 150 or lighting source 152 can be random to provide for equal use and life span of the lighting sources and ballasts associated with lighting source 150 and lighting source 152.

Because lighting fixture 100 can use a combination of sensors 51 and 52, it is thus possible, as shown above, to illuminate the lighting fixture 100 not only when a user is detected in the second detection area 102 directly under the lighting fixture, but it is also possible to illuminate the lighting fixture 100 when users are detected in the first detection area 101 around lighting fixture 100 based on the ability of sensor 51 to detect users in areas proximate to adjacent lighting fixtures, such as under lighting fixtures 200 and 300. In this regard, sufficient lighting can be achieved in an area where a user is present through the use of only a few lighting fixtures rather than illuminating all of the lighting fixtures in a room or space. In addition, this can be accomplished without the need for wireless communication between neighboring or nearby lighting fixtures based on the use of at least two sensors in one lighting fixture that can detect the presence of a user in more areas than the area immediately under the lighting fixture.

In summary, the level of illumination from the lighting fixture 100 shown in FIG. 3, where the first sensor 51 and second sensor 52 overlap in their detection areas 101 and 102, can be increased or decreased based on what each sensor detects, as shown below in Table 1:

TABLE 1

| FIG. 3 Lighting Output | | |
|---|---|---|
| First Sensor 51 | Second Sensor 52 | Illumination Level |
| On | Off | Decreased |
| On | On | Increased |
| Off | On | N/A |
| Off | Off | Zero |

For example, when the first sensor 51 detects a user in the wider first detection area 101 but the second sensor 52 does not detect a user in the second detection area, the level of illumination is decreased. This can be accomplished by either illuminating the one or more lighting sources, such as lighting sources 150 and 152, at less than full power, or by randomly illuminating one of the lighting sources, such as by randomly illuminating either lighting source 150 or lighting source 152.

Meanwhile, when a user is detected in both detection areas 101 and 102 by sensors 51 and 52, the level of illumination is increased. For example, both lighting sources 150 and 152 can be illuminated at full power, resulting in an increased level of illumination.

With the overlapping sensor configuration shown in FIG. 3, it is not possible for a user to be detected in the second detection area 102 yet not be detected in the first detection area 101 due to the at least partial overlap of these areas under the lighting fixture 100. In other words, if a user is detected in detection area 102 by sensor 52, the user must necessarily be present in at least part of detection area 101 as well. This means that there cannot be a situation where sensor 52 has detected a user but sensor 51 has not, and thus, the logic for the lighting output in such a situation is shown as not applicable in Table 1 above.

Finally, if no user is detected by either first sensor 51 or second sensor 52, all of the lighting sources, such as lighting sources 150 and 152, remain off so that the illumination level is zero.

A second possible configuration for the first and second sensors 51, 52 is that the first and second sensors 51, 52 do not have overlapping detection areas directly under the lighting fixture 100. Such a configuration is shown in FIG. 4, and the level of illumination of the lighting fixture based on various detection scenarios is shown in Table 2 below. In the particular embodiment of FIG. 4, the wider first detection area 101 for lighting fixture 100 is represented by dashed lines with cross-hatches. Meanwhile, the narrower second detection area 102 for lighting fixture 100 is represented by dashed lines. As can be seen from FIG. 4, the first detection area 101 is disjunctive from, or not connected to/overlapping with, second detection area 102, and is represented by parts 101*a* and 101*b*. The first detection area 101 reaches areas proximate adjacent lighting fixtures, such as lighting fixtures 200 and 300, while the second detection area 102 is proximate the area beneath the lighting fixture 100.

Referring to FIG. 4, when a user is standing under lighting fixture 100, for example, sensor 52 (shown in FIG. 1), which is associated with the second detection area 102, will detect the user and send a signal to the controller 350 associated with lighting fixture 100. The controller 350 (shown in FIG. 1) associated with lighting fixture 100 is then configured to control the one or more lighting sources, such as lighting sources 150 and 152, to provide an increased level of illumination. In this instance, lighting sources 150 and 152 can be illuminated at full power in such a detection scenario. Further, both lighting sources 150 and 152 can be illuminated when a user is detected in detection area 102.

Meanwhile, if the user moves from standing under lighting fixture 100 to standing under either lighting fixture 200 to the left or lighting fixture 300 to the right, sensor 51 (shown in FIG. 1), which is associated with sections 101*a* and 101*b* of first detection area 101 that correspond to an area proximate adjacent lighting fixture 200 and lighting fixture 300, will detect the user and send a signal to the controller 350 associated with lighting fixture 100. As with the scenario shown in FIG. 3, the controller 350 (shown in FIG. 1) associated with lighting fixture 100 is then configured to control the one or more lighting sources, such as lighting sources 150 and 152, to provide a decreased level of illumination. In this instance, both lighting sources 150 and 152 can be illuminated at less than full power in such a detection scenario. As an alternative, either lighting source 150 or lighting source 152 can be illuminated. Further, the illumination of lighting source 150 or lighting source 152 can be random to provide for equal use and life span of the lighting sources and ballasts associated with lighting source 150 and lighting source 152.

In summary, the level of illumination from the lighting fixture 100 shown in FIG. 4, where the first sensor 51 and second sensor 52 do not overlap in their detection areas 101 (101a and 101b) and 102, can be increased or decreased based on what each sensor detects, as shown below in Table 2:

TABLE 2

FIG. 4 Lighting Output

| First Sensor 51 | Second Sensor 52 | Illumination Level |
| --- | --- | --- |
| On | Off | Decreased |
| On | On | Increased |
| Off | On | Increased |
| Off | Off | Zero |

For example, as in FIG. 3, when the first sensor 51 detects a user in the wider first detection area 101 but the second sensor 52 does not detect a user in the second detection area, the level of illumination is decreased. This can be accomplished by either illuminating the one or more lighting sources, such as lighting sources 150 and 152, at less than full power, or by randomly illuminating one of the lighting sources, such as by randomly illuminating either lighting source 150 or lighting source 152.

Meanwhile, when a user is detected in both detection areas 101 and 102 by sensors 51 and 52, the level of illumination is increased. For example, both lighting sources 150 and 152 can be illuminated at full power, resulting in an increased level of illumination.

Unlike the configuration shown in FIG. 3, with the configuration shown in FIG. 4, it is possible for a user to be detected in the second detection area 102 yet not be detected in either section 101a or 101b of first detection area 101 because these detection areas do not overlap under the lighting fixture 100. In such a situation, the level of illumination is increased, as it is in the scenario when users are detected in both detection areas.

Finally, if no user is detected by either sensor 51 or sensor 52, all of the lighting sources, such as lighting sources 150 and 152, remain off so that the illumination level is zero.

As shown, the embodiments of FIGS. 3 and 4 can control the illumination of one or more lighting sources associated with a lighting fixture by increasing or decreasing the level of illumination based upon the presence of a user in various detection areas beneath or around the lighting fixture. The amount of illumination can be controlled by illuminating the various lighting sources at full power or at less than full power, or by controlling the number of lighting sources that are illuminated in the first instance. A technical effect associated with embodiments of the invention is that it uses movement and/or occupancy sensors, with no communication between separate light fixtures, to determine which ballast(s) to switch on based on outputs from the movement and/or occupancy sensors that are indicative of a presence of a user in at least a first detection zone and a second detection zone. Exemplary technical and/or commercial advantages over traditional systems include, but are not limited to: a low cost, simple installation that requires no additional wires or wireless communication.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lighting fixture, comprising:
a controller;
a first sensor configured to send a signal to the controller upon the detection of a presence of a user in a first detection area; and
a second sensor configured to send a signal to the controller upon the detection of a presence of a same or different user in a second detection area;
wherein the controller is configured to provide varying levels of illumination based at least in part on the signals received from the first sensor and the second sensor;
wherein the first detection area extends to an area proximate an adjacent lighting fixture and wherein the second detection area is proximate an area beneath the lighting fixture; and
wherein the controller is configured provide an output that causes the lighting fixture to have a reduced illumination when the first sensor detects the presence of a user in the first detection area and the second sensor does not detect the presence of a user in the second detection area.

2. The lighting fixture of claim 1, wherein the first detection area and the second detection area at least partially overlap.

3. The lighting fixture of claim 1, wherein the first detection area and the second detection area are disjunctive.

4. The lighting fixture of claim 1, wherein the controller is configured to provide less than full power when the first sensor detects the presence of a user in the first detection area.

5. The lighting fixture of claim 1, further comprising one or more lighting sources coupled with the controller,
wherein the one or more lighting sources comprises a first lighting source and a second lighting source, and
wherein the controller is configured to randomly illuminate either the first lighting source or the second lighting source when the first sensor detects the presence of a user in the first detection area.

6. The lighting fixture of claim 1, wherein the controller is configured to provide an output that causes the lighting fixture to have an increased level of illumination when the second sensor detects the presence of a user in the second detection area.

7. The lighting fixture of claim 6, wherein the controller is configured to provide full power when the second sensor detects the presence of a user in the second detection area.

8. The lighting fixture of claim 6, further comprising one or more lighting sources,
wherein the one or more lighting sources comprises a first lighting source and a second lighting source, and
wherein the controller is configured to illuminate the first lighting source and the second lighting source when the second sensor detects the presence of a user in the second detection area.

9. A method for controlling illumination of an area, the method comprising:
monitoring for a presence of a user in a first detection area with a first sensor associated with a lighting fixture;
monitoring for a presence of a same or different user in a second detection area with a second sensor associated with the lighting fixture; and controlling illumination of one or more lighting sources associated with the lighting fixture via a controller upon detection of the user in the first detection area or the second detection area;

wherein the first detection area extends to an area proximate an adjacent lighting fixture and wherein the second detection area is proximate an area beneath the lighting fixture; and wherein controlling the illumination of the one or more lighting sources comprises reducing the level of illumination upon the detection of a user in the first detection area and lack of detection of a user in the second detection area.

10. The method of claim 9, wherein the first detection area and the second detection area at least partially overlap.

11. The method of claim 9, wherein the first detection area and the second detection area are disjunctive.

12. The method of claim 9, wherein the one or more lighting sources comprises a first lighting source and a second lighting source, wherein controlling the illumination of the one or more lighting sources comprises randomly illuminating the first lighting source or the second lighting source upon the detection of a user in the first detection area.

13. The method of claim 9, wherein controlling the illumination of the one or more lighting sources comprises increasing the level of illumination upon the detection of a user in the second detection area.

* * * * *